United States Patent
James et al.

(10) Patent No.: US 6,389,547 B1
(45) Date of Patent: May 14, 2002

(54) METHOD AND APPARATUS TO SYNCHRONIZE A BUS BRIDGE TO A MASTER CLOCK

(75) Inventors: David Vernon James, Palo Alto; Bruce Fairman, Woodside; Glen David Stone, Campbell, all of CA (US)

(73) Assignees: Sony Corporation, Tokyo (JP); Sony Electronics, Inc., Park Ridge, NJ (US)

(*) Notice: Subject to any disclaimer, the term of this patent is extended or adjusted under 35 U.S.C. 154(b) by 0 days.

(21) Appl. No.: 09/531,063

(22) Filed: Mar. 18, 2000

Related U.S. Application Data

(60) Provisional application No. 60/125,321, filed on Mar. 19, 1999.

(51) Int. Cl.[7] .................................................. G06F 1/04
(52) U.S. Cl. .................................... 713/400; 713/503
(58) Field of Search .............................. 713/400, 503; 710/100, 126, 128, 129

(56) References Cited

U.S. PATENT DOCUMENTS

| | | | | |
|---|---|---|---|---|
| 4,531,185 A | * | 7/1985 | Halpern et al. | 709/400 |
| 5,327,468 A | * | 7/1994 | Edblad et al. | 375/356 |
| 5,504,878 A | * | 4/1996 | Coscarella et al. | 709/248 |
| 5,511,165 A | | 4/1996 | Brady et al. | |
| 5,774,683 A | | 6/1998 | Gulick | |
| 5,832,245 A | | 11/1998 | Gulick | |
| 5,854,910 A | | 12/1998 | Gulick | |
| 5,923,673 A | | 7/1999 | Henrikson | |
| 5,941,964 A | | 8/1999 | Young et al. | |
| 5,970,234 A | | 10/1999 | Jin | |
| 6,032,261 A | * | 2/2000 | Hulyalkar | 713/400 |
| 6,061,411 A | * | 5/2000 | Wooten | 375/372 |
| 6,108,447 A | * | 8/2000 | Lord et al. | 382/232 |

OTHER PUBLICATIONS

International Search Report PCT/US01/08396, Mar. 15, 2001, pp. 4.
Hoffman, et al. "IEEE 1394: Ubiquitous Bus" COMPCON '95, San Francisco, California, Mar. 5–9, pp. 9.
Jennings, R. "Fire on the Wire: The IEEE 1934 High Performance Serial Bus" 1995–99, pp. 18.
IEEE 1394: A Ubiquitous Bus, Compcon '95 in San Francisco, Gary Hoffman and Daniel Moore, Mar. 5–9, 1995, http://www.skipstone.com/compcon.html (9 pages).
Fire on the Wire: The IEEE 1934 High Performance Serial Bus, Roger Jennings, http://www.chumpchange.com/parkplace/video/dvpapers/firewire.html (18 pages).

* cited by examiner

*Primary Examiner*—Dennis M. Butler
(74) *Attorney, Agent, or Firm*—Blakely, Sokoloff, Taylor & Zafman LLP

(57) ABSTRACT

A method and apparatus for synchronizing a bus bridge to a master clock comprising receiving a time stamp packet at an input clock register of the bus bridge, comparing the value of the input clock register to the value of an output clock register of the bus bridge, obtaining an error value of the output clock register from the comparison, and determining whether the error value is below a predetermined threshold are described.

20 Claims, 11 Drawing Sheets

METHOD AND APPARATUS TO SYNCHRONIZE A BUS BRIDGE TO A MASTER CLOCK

This application claims benefit of U.S. Provisional Application No. 60/125,321 filed Mar. 19, 1999.

FIELD OF THE INVENTION

The present invention relates generally to audio, video, and audio/video interconnected systems for home and office use. In particular, the present invention relates to time synchronization in a topology of audio, video, and audio/video interconnect systems.

BACKGROUND OF THE INVENTION

With the development of consumer electronic audio/video (A/V) equipment, and the advance of digital A/V applications, such as consumer A/V device control and signal routing and home networking, various types of data in various formats can now be transferred among several audio/video control (AV/C) devices via one digital bus system. However, many current systems do not have sufficient bandwidth resources to transfer and display all the different types of data at the same time.

Typical computer systems solve the bandwidth problem by increasing the bandwidth of the system bus to handle all of these forms, types and amount of data. As a result, as users request more types of information such as in multimedia applications, the system bus has become more clogged with information other than information directly utilized and needed by the main processor.

Many computer systems incorporate at least two buses. A first bus, commonly referred to as a memory bus, is typically used for communications between a central processor and a main memory. A second bus, known as a peripheral bus, is used for communications between peripheral devices such as graphics systems, disk drives, or local area networks. To allow data transfers between these two buses, a bus bridge is utilized to "bridge" and there by couple, the two buses together.

One example of a high-speed bus system for interconnecting A/V nodes, configured as a digital interface used to transport commands and data among interconnecting audio/video control (AV/C) devices, is the IEEE 1394 standard serial bus implemented by IEEE Std 1394-1995, Standard For A High Performance Serial Bus, Aug. 30, 1996 (hereinafter "IEEE 1394 standard") and related other 1394 standards.

The IEEE 1394 standard is an international standard for implementing a high-speed serial bus architecture, which supports both asynchronous and isochronous format data transfers. The IEEE 1394 standard defines a bus as a non-cyclic interconnect, consisting of bus bridges and nodes. Within a non-cyclic interconnect, devices may not be connected together so as to create loops. Within the non-cyclic interconnect, each node contains an AV/C device, and bus bridges serve to connect buses of similar or different types.

The primary task of a bridge is to allow data to be transferred on each bus independently without demonstrating performance of the bus, except when traffic crosses the bus bridge to reach the desired destination on the other bus. To perform this function, the bridge is configured to understand and participate in the bus protocol of each of the buses.

Multi-bus systems are known to handle the large amounts of information being utilized. However, communication between buses and devices on different buses is difficult. Typically, a bus bridge may be used to interface I/O buses to the system's high-performance processor/memory bus. With such I/O bridges, the CPU may use a 4-byte read and write transaction to initiate DMA transfers. When activated, the DMA of a serial bus node generates split-response read and write transactions which are forwarded to the intermediate system backbone bus which also implements serial bus services.

Depending on the host system design, the host-adapter bridge may have additional features mandated by differences in bus protocols. For example, the host bus may not directly support isochronous data transfers. Also, the host-adapter bridge may enforce security by checking and translating bridge-bound transaction addresses and may often convert uncached I/O transactions into cache-coherent host-bus transaction sequences.

Each time a new device or node is connected or disconnected from an IEEE 1394 standard serial bus, the entire bus is reset and its topology is reconfigured. The IEEE 1394 standard device configuration occurs locally on the bus without the intervention of a host processor. In the reset process, three primary procedures are typically performed; bus initialization, tree identification, and self identification. Within the IEEE 1394 standard, a single node must first be established as the root node during the tree identification process in order for the reconfiguration to occur.

SUMMARY OF THE INVENTION

A method and apparatus for synchronizing a bus bridge to a master clock comprising receiving a time stamp packet at an input clock register of the bus bridge, comparing the value of the input clock register to the value of an output clock register of the bus bridge, obtaining an error value of the output clock register from the comparison, and determining whether the error value is below a predetermined threshold are described.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Figure 1:
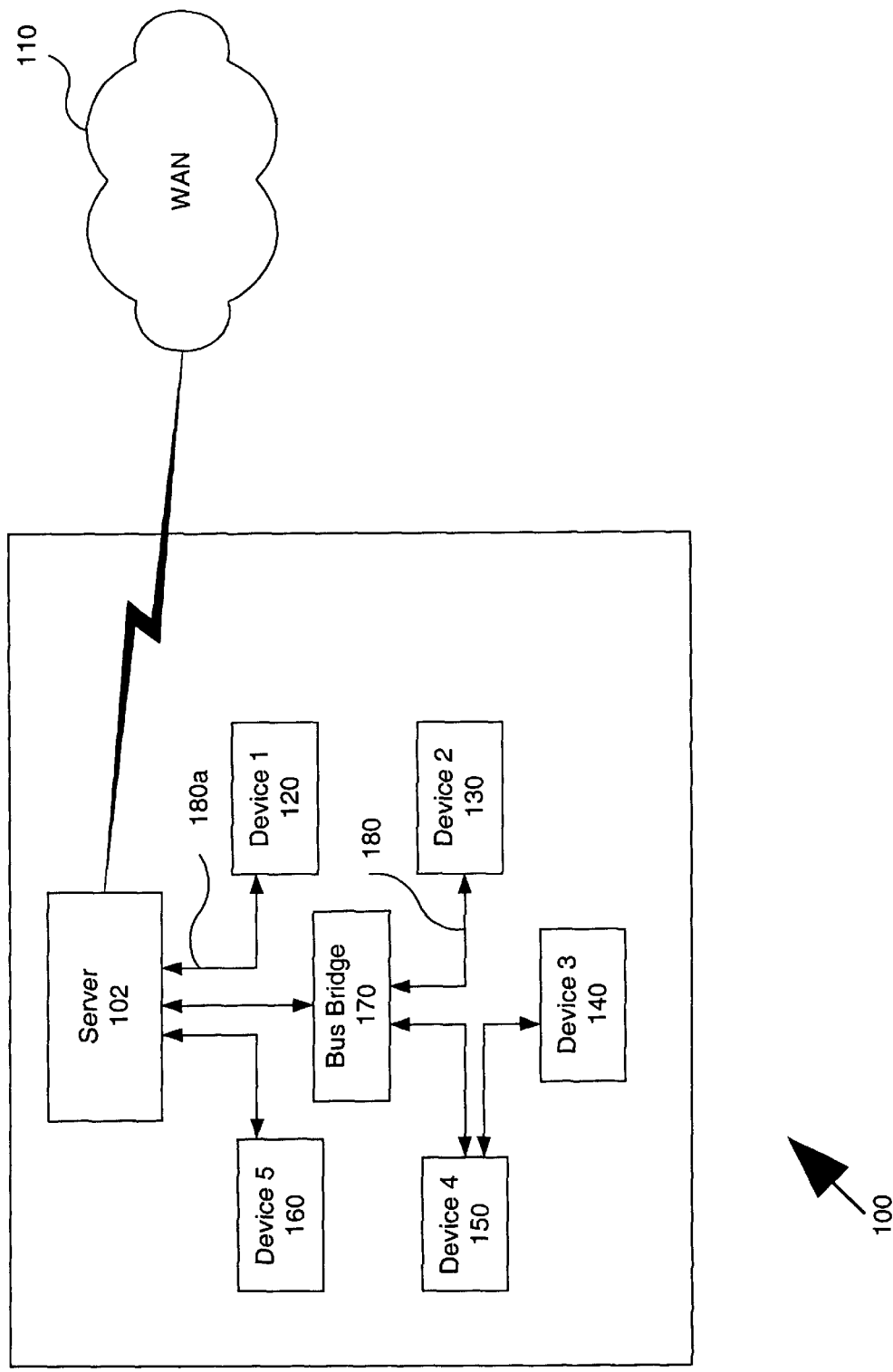
FIG. 1 is a block diagram of one embodiment for an interconnect topology.

FIG. 1 is a block diagram of one embodiment for an interconnect topology 100. Referring to FIG. 1, server 102 is connected to a wide area network (WAN) 110 and to a bus bridge 170. The bus bridge is interconnected to a number of audio, video, and/or audio/video devices 120, 130, 140, 150, and 160. In one embodiment, the devices (120–160) are connected to bus bridge 170 via the IEEE 1394 standard serial bus. Server 102 may be any device that is capable of connection to both a bus bridge 170 and wide area network 110 such as, for example, a personal computer or a set-top box. In one embodiment, network 110 may be a wide area network such as, for example, the Internet, or a proprietary network such as America Online®, Compuserve®, Microsoft Network®, or Prodigy®. In addition, WAN 110 may be a television communications network. Server 102 includes a network interface which communicates with WAN 110.

Topology 100 includes high speed serial bus 180a and 180b. In one embodiment, serial bus 180 is the IEEE 1394 standard serial bus. Topology 100 includes various consumer electronic devices 120–160 connected via the high speed serial bus 180 to bus bridge 170. The consumer electronic devices 120–160 may include, for example, a printer, additional monitor, a video camcorder, an electronic still camera, a video cassette recorder, digital speakers, a personal computer, an audio actuator, a video actuator, or any other consumer electronic devices that includes a serial interface which complies a the serial interface standard for networking consumer electronic devices—for example, the IEEE 1394 standard. Topology 100 may be contained within a home or office. Bus bridge 170 is used to connect devices 120–160 in which devices 120–160 may be physically located within different rooms of the home or office. Although the original IEEE bus standard is designed for use with a cable interconnect, any communication media may be used such as radio frequency (RF) communication or the like.

Figure 2:
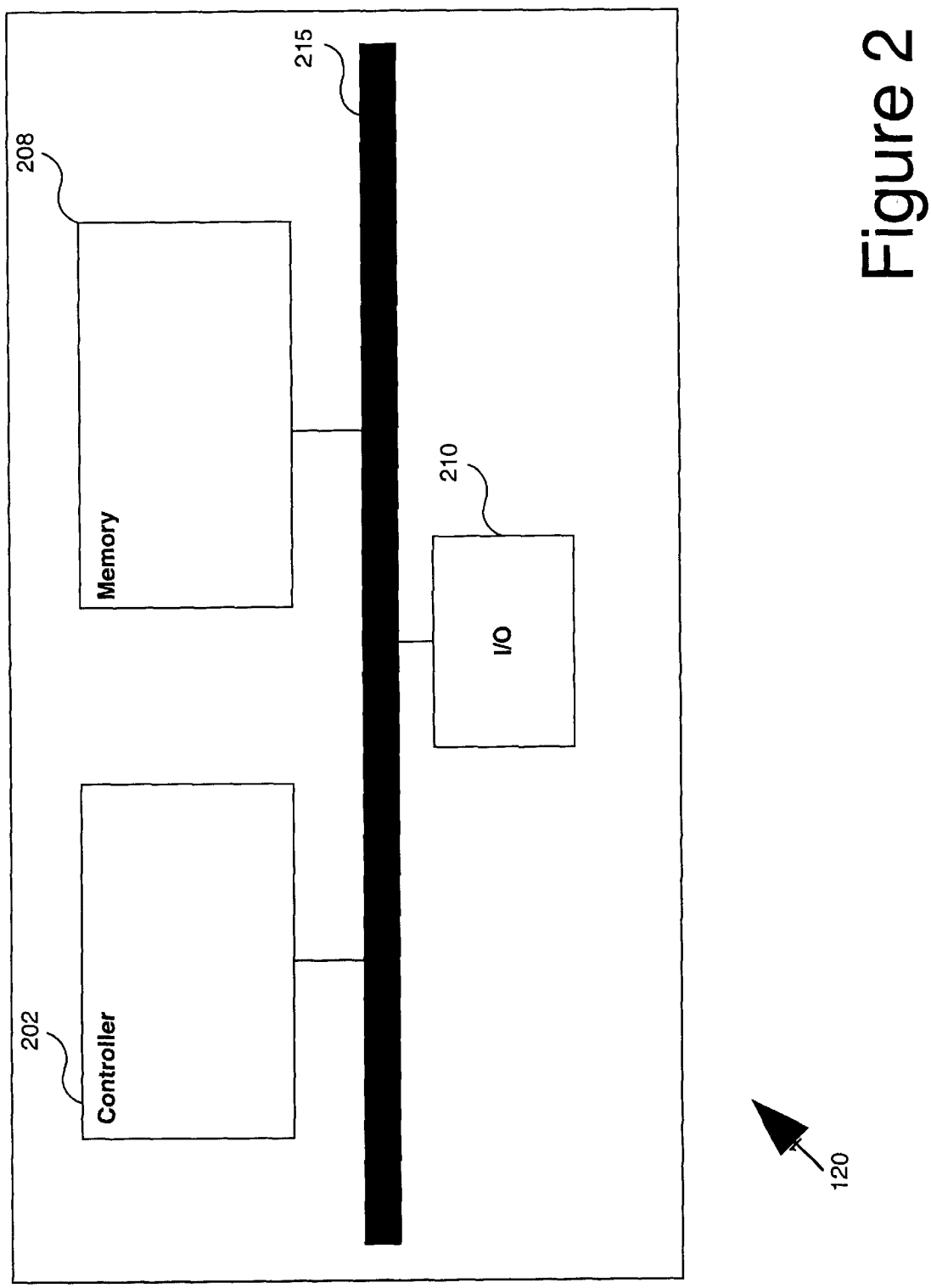
FIG. 2 is a block diagram of a device of FIG. 1.

FIG. 2 is a block diagram of a device 120. Referring to FIG. 2, device 120 may be a laser printer, digital camera, set-top box, or any other appropriate consumer electronic device capable of being connected via a high speed serial bus 180. In one embodiment, the device 120 includes a controller 202, memory 208, and I/O 210, all connected via bus 215. Memory 208 may include, for example, read only memory (ROM), random access memory (RAM), and/or non-volatile memory. I/O 210 provides connection with wide area network 110, bus bridge 170, and another peripheral device (130–160).

In one embodiment, I/O 210 is a serial bus interface that complies with a serial interface standard for networking with consumer electronic devices (120–161) and bus bridge 170 within topology 100. For example, the serial bus interface and topology 100 may use the IEEE 1394 standard serial bus. I/O 210 provides for receiving signals from and transmitting signals to other consumer electronic devices (130–160) or bus bridge 170.

Memory 208 provides temporary storage for voice and data signal transfers between outside network 110 and topology 100. In addition, memory 208 may buffer digital voice and data signals received by I/O 210 from WAN 110 before signals are transmitted onto IEEE 1394 standard bus 180.

Controller 202 controls various operations of device 120. Controller 202 monitors and controls the traffic through the device 120 to and from topology 100 and WAN 110.

Device 120 I/O 210 may have one or more physical ports. A single port device discontinues the bus along the given branch of the bus, whereas devices with two or more ports allow continuation of the bus. Devices with multiple ports permit a daisy chained bus topology, even though the signaling environment is point-to-point. That is, when a multi-port node receives a packet of data, the data is detached and retransmitted to the necessary port as indicated within the data. The configuration is performed dynamically as new devices are attached and/or removed from bus 180.

The 1394 standard bus protocol is designed to support peer-to-peer transfers between devices. This allows serial bus devices to transfer data between themselves without intervention from a computer system or host system. This allows high through-put between devices without affecting the performance of the computer system. Thus, a video camera may be set up to transfer between itself and a video cassette recorder without accessing a computer system.

Figure 3:
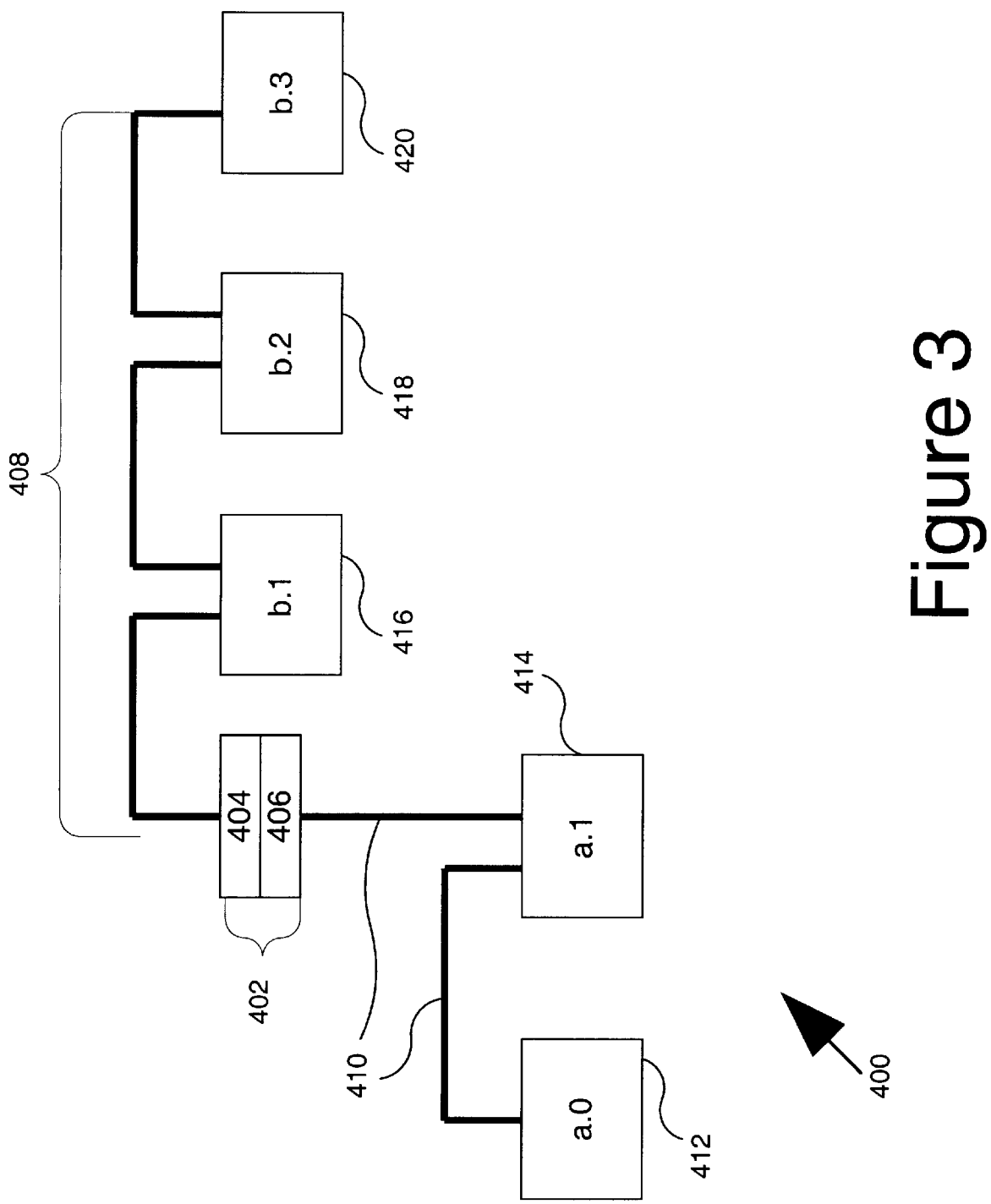
FIG. 3 is a block diagram of one embodiment for a 1394 standard bus bridge system.

FIG. 3 is a block diagram of one embodiment for a 1394 standard bridge bus system 400. Referring to FIG. 3, system 400 includes bridge 402 which connects two or more buses 408 and 410. Bus 408 and 410 may be the same or different types of buses. For example, bus 408 may be a 1394 standard serial bus and bus 410 may be a different, high performance bus. The 1394 standard bus architecture limits the number of nodes or devices 310 on a bus 263 and supports multiple bus systems via bus bridge 402.

The control and status register (CSR) architecture, ISO/IEC 13213 (ANSI/IEEE 1212), Information systems—Control and Status Registers (CSR) Architecture Microcomputer Buses, defines the 1394 standard bus addressing structure which allows approximately $2^{16}$ nodes (404, 406, 412–420). The CSR standard defines their registry, their functionality, and, where appropriate, where they appear in the address space.

Figure 4:
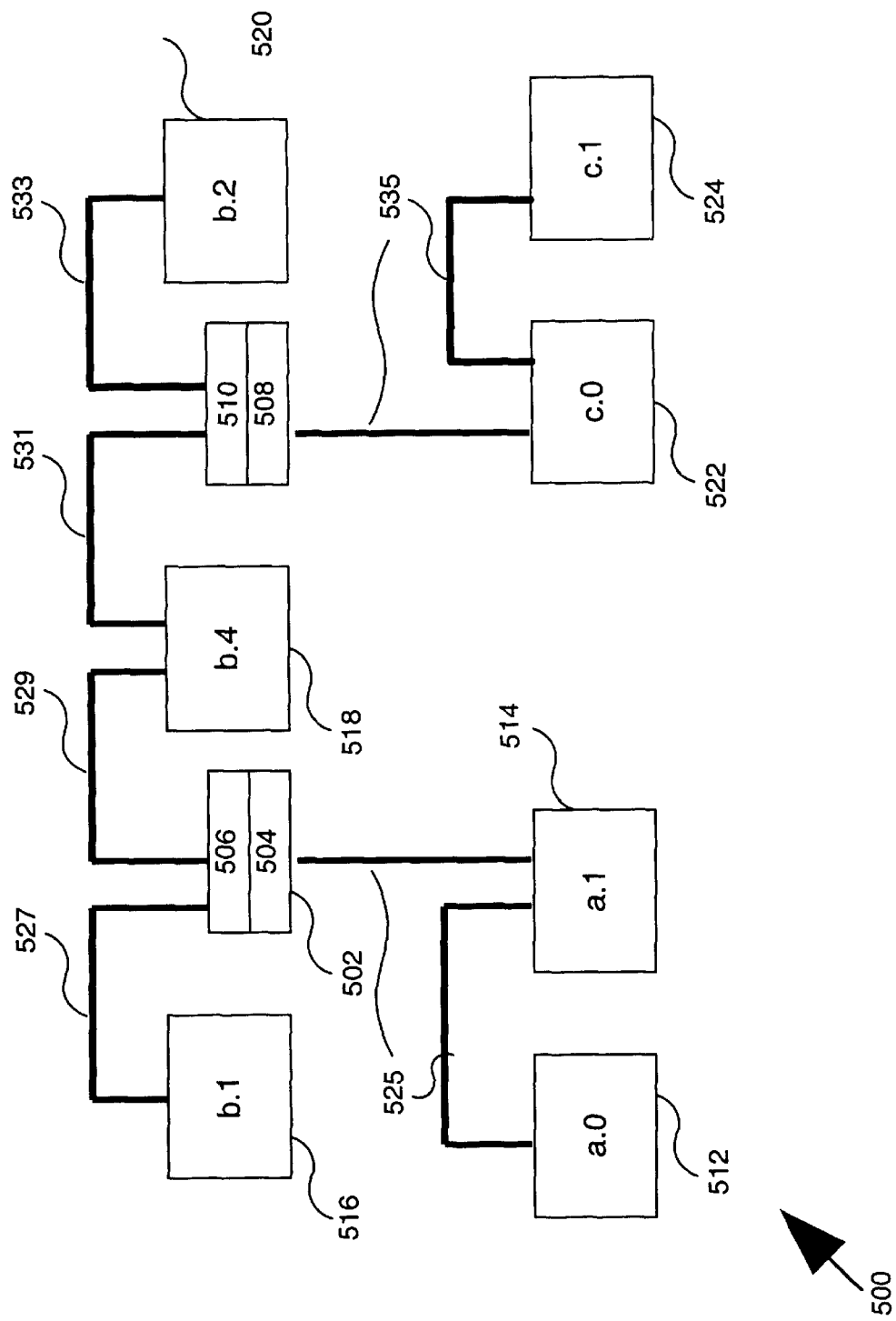
FIG. 4 is a block diagram of one embodiment for a 1394 bus bridge topology.
Figure 5:
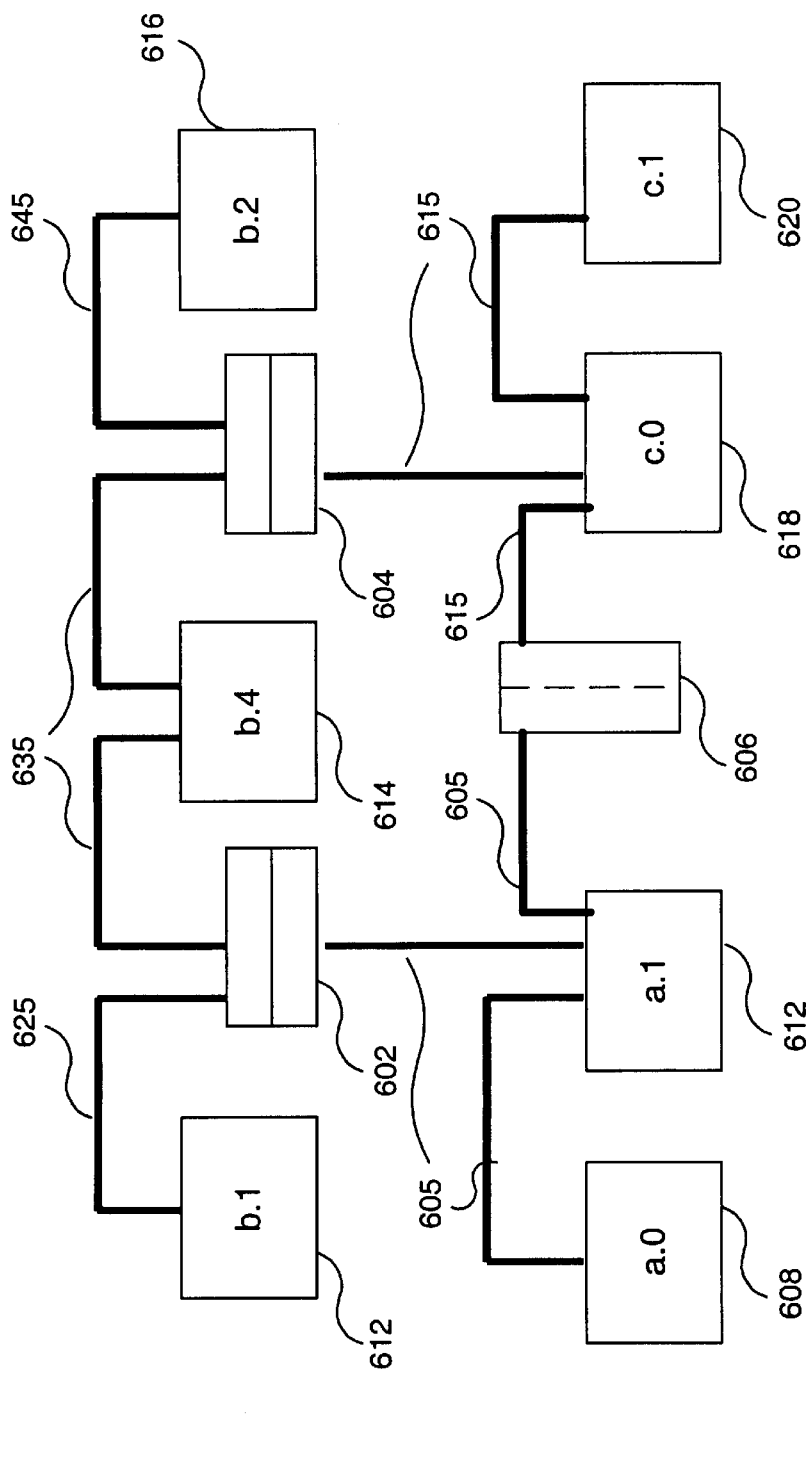
FIG. 5 is a block diagram of one embodiment for a looped bus bridge topology.

FIG. 3 is the simplest instance of a bus topology in which the net has one bus bridge. FIG. 4 illustrates a net that may have more than one bus bridge and, when so structured, is hierarchical in nature. FIG. 5 illustrates a network whose physical topology may have loops, but whose loops are electronically disabled to generate a hierarchical structure. In the description that follows, a collection of multiple buses connected through a bus bridge is referred to as a "net".

FIG. 4 is a block diagram of one embodiment for a 1394 bridge bus topology 500. Referring to FIG. 4, topology 500 has one prime portal 504 and one or more alpha portals 506 and 508. The primary bus 525 has exactly one prime portal 504 and the secondary buses 527, 529, 531, 533, and 535 have exactly one alpha portal each—506, 508 and 510. Each bus 525–535 may have any number of secondary portals. An alpha portal is on the path to a prime portal. Any portal not a prime portal or an alpha portal is a secondary portal. The prime portal or the alpha portal may be referred to as a primary portal.

Within an interconnect topology 500, the bridge portal with the largest portal ID identifier is elected to become the prime portal 504. In an alternate embodiment, the bridge portal with the smallest portal ID identifier is elected to become the prime portal 504. Each portal appears as a node on its attached bus. The bus with the prime portal 504 is termed the primary bus 525 and other buses 527–535 are termed secondary buses. On secondary buses 527–535, the bridge portal that leads to the primary bus 525 is called the alpha portal (506, 508). After a bridge bus interconnect is configured, any node within the interconnect may be accessed by its unique 16-bit node identification address. The node identification address contains the bus ID and the local ID components. Referring to FIG. 4, the bus identification ID of nodes 512–524 are indicated by the letters a, b, and c and the local ID is indicated by the numbers 0–4.

Alpha portal 504 is responsible for rejecting missed address asynchronous data packets by accepting these requests and returning error reporting responses. The previous and current prime and alpha portal identifiers are used to classify nodes when an interconnect topology changes, and the alpha portal is the isochronous clock reference for other nodes on the bus.

Bus bridge topology 500 may change and be established dynamically during operation of bus bridge system 500. In one embodiment, the bus bridge topology 500 is established during net refresh. Within topology 500, portals selectively route packets. Asynchronous routing tables are stable until topology 500 changes during a net refresh or net reset operation. Asynchronous routing tables are dynamic and are changed by their asynchronous connect and disconnect operations of the protocols.

FIG. 5 is a block diagram of one embodiment for a looped bus bridge topology 600. Referring to FIG. 5, during node 300 addition, portal 606 may be added to the topology 600 forming a loop. Thus, a path exists from a0-b4 through c0 back to a0. During initialization, the redundant portal 606 is disabled so that a hierarchical bus bridge topology remains.

In an alternate embodiment, cyclical net topologies may be allowed. In this alternate embodiment, software routines may partially activate the redundant bridge 606 and allow a shortest path routing between nodes. For example, traffic between bus a 605 and bus c 615 may be efficiently routed without introducing deadlocks.

Figure 6:
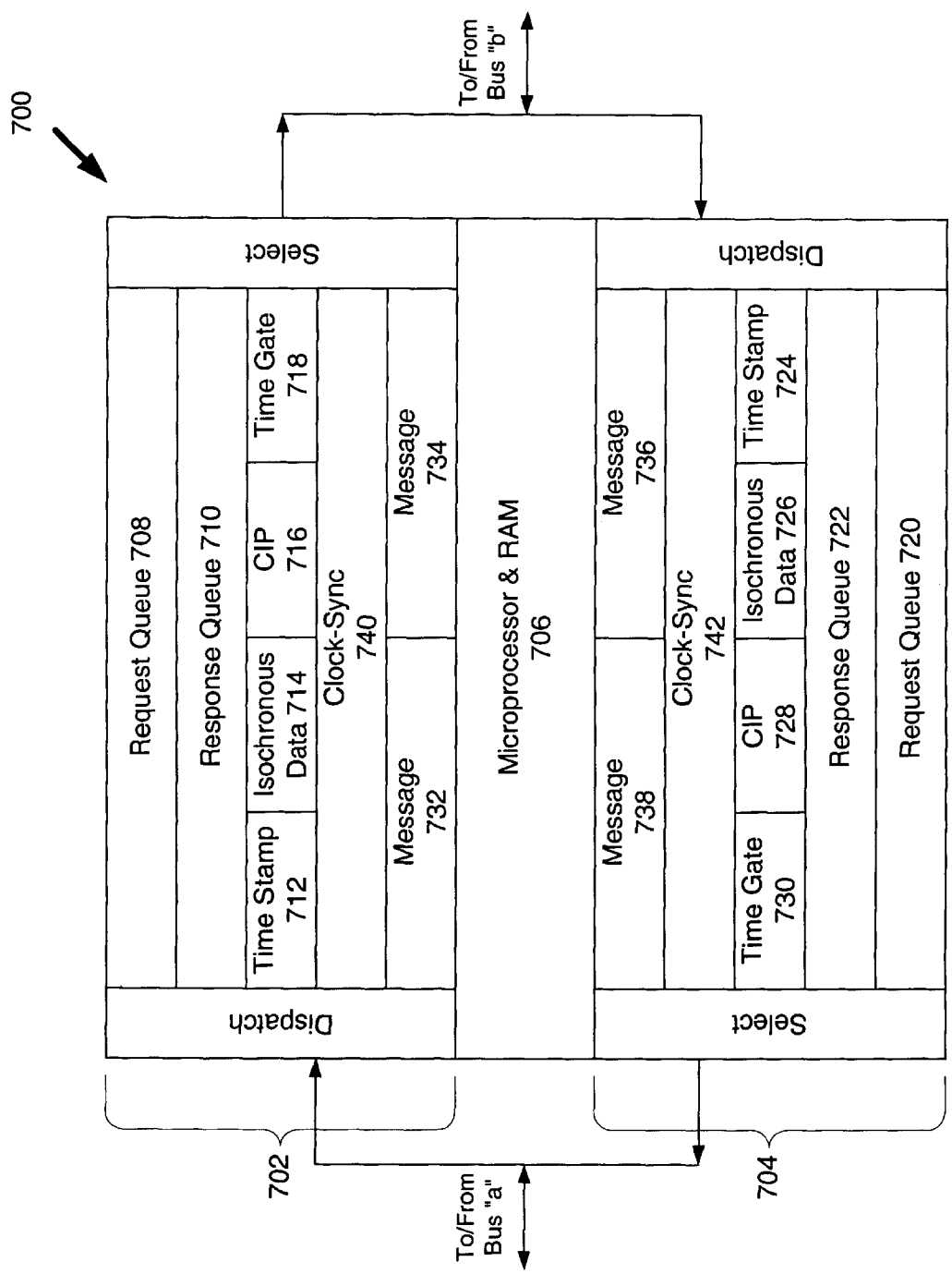
FIG. 6 is a block diagram of one embodiment for bus bridge components.

FIG. 6 is a block diagram of one embodiment for bus bridge components 700. Referring to FIG. 6, bus bridge components 700 are maintained within each portal in which bus "a" to bus "b" components 702 and bus "b" to bus "a" components 704 are independently maintained. Components 700 also contains shared microprocessor and RAM 706.

Asynchronous and isochronous packet transfers may not acquire a bus at the same time. Therefore, asynchronous packets are placed in request queues 708, 720 and response queues 710, 722. The asynchronous packets are selected for transfer at times when isochronous packets are not being transferred. Isochronous packets are received and time stamped 712, 724. Time gates 718, 730 release the isochronous packets 714, 726, together with common isochronous packet (CIP) headers 716, 728, at fixed times. Routing tables select which asynchronous and isochronous packets are accepted and queued for adjacent bus delivery.

Topologies may share physical buffer space rather than implementing physical distinct stacks subject to the following: bus "a" to bus "b" and bus "b" to bus "a" queues operate independently, response processing is never blocked by queued requests, and asynchronous subactions and isochronous packets are forwarded independently. Topologies may block a request behind the previously queued response without generating potential deadlocks; however, requests and responses are processed independently.

Isochronous routing decisions are made by checking the isochronous packet's channel number. Accepted packets are converted and retransmitted on the adjacent bus with newly assigned channel numbers, speeds, and CIP-header and, when a CIP-header is provided, time-stamp parameters 716, 728 from the CIP-header. CIP-headers may be pre-appended to some isochronous packets to further describe their format and function and desired presentation time. When the packets incur delays while traversing through a bridge, then presentation time must be adjusted to compensate for this delay. CIP headers are defined in ISO/IEC 61883 specification. Isochronous packets received in cycle n are forwarded to the adjacent bus in cycle n+k where k is an implementation dependent constant. Messages may be passed around one bus or pass through a bridge by writing to a standardized message location 732, 734, 736, 738 on a bridge's portal. This allows bus-interconnect topologies to be restored while freezing, or discarding when necessary, previously queued subactions.

Distribution of clock-sync information 740, 742 from the primary-bus source is performed by placing calibration information in isochronous-clock pseudo queues before forwarding this information to the clock master on the adjacent portal. In one embodiment, clock-sync information flows from the primary bus downward, so that only one clock-sync pseudo queue may be required.

In support of bus bridges, each node has two node ID addresses: physical ID address and virtual ID address. A physical node ID has a $3FF_{16}$ valued bus ID; a virtual node ID has smaller bus ID addresses. In the absence of bus bridges, all nodes are accessed through their physical addresses. In the presence of bus bridges, the physical address is used to configure the node and the virtual address is normally used thereafter.

Directed-asynchronous routing decisions are made by checking the destination ID addresses of pass-through packets. Accepted packets are directly routed to the bridge's opposing port. In addition, an asynchronous quarantine is maintained which selectively enables forwarding of a request sub-action based on the local identification of a bus-local requester. A set of legacy bits identifies local nodes which requires specific processing of sourced requests and returning responses.

Figure 7:
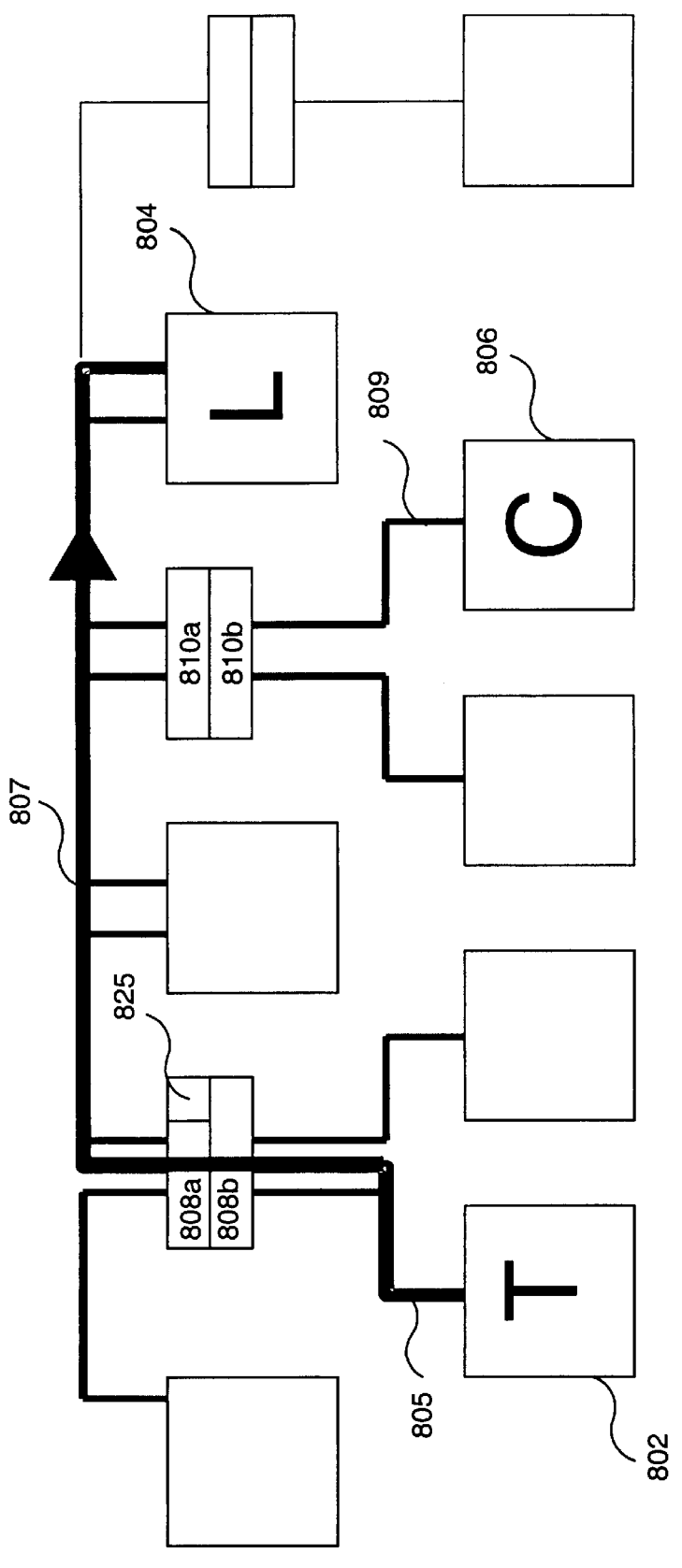
FIG. 7 is a block diagram of one embodiment for bus bridge isochronous transfer.

FIG. 7 is a block diagram of one embodiment for bus bridge isochronous transfer. Referring to FIG. 7, isochronous connections involve one talker 802 and one or more multiple listener 804/controller 806 pairs. Isochronous packets are accepted based on the current channel identification and are retransmitted on the adjacent bus with a new channel ID. A controller 806 establishes an isochronous connection. The isochronous connection enables communication between talker 802 and listener 804. An isochronous connection may be made between a single talker 802 and multiple listeners 804.

Isochronous non-overlaid connections proceed as follows: controller 806 sends a message to the final portal 810a in the path towards listener 804. If necessary, portal 810a forwards the message to the first portal on the path between the listener 804 and talker 802 (in this case, portal 808a). Portal 808a acquires isochronous resources from IRM 825 on its bus. IRM may be located within portal 808a or any other node. The message is forwarded towards the talker bus 805, which results in the message being received by portal 808b. Portal 808b acquires the isochronous resources in IRM 825 and updates the oPCR within talker 802. The message is forwarded back toward listener 804, which results in it being received by portal 808a. Portal 808a updates the iPCR on listener 804 so that it listens to the correct channel. Portal 808a forwards a message-complete indicator to controller 806.

In one embodiment, a disconnect message is sent from controller to portal 810*b*. Portal 810*b* forwards the message to portal 808*a* which updates the iPCR on listener 804 and releases the IRM resources associated with bus 807. The message is forwarded to portal 808*b*. The oPCR of talker 802 is updated in order to stop transmission. Portal 808*b* updates the IRM resources associated with bus 805. A completion message is then sent from portal 808*b* to controller 806.

In an alternate embodiment, controller 806 sends a disconnect message toward listener 810*a*, which results in the message being received by portal 810*a*. Portal 810*a* forwards the message to portal 808*a* (the talker side portal of listener 804). Portal 808*a* forwards the message towards talker 802, which results in the message being received by portal 808*b*. Portal 808*b* updates the oPCR of talker 802 in order to stop transmission. Portal 808*b* accesses IRM 825 to release isochronous channel and bandwidth resources associated with bus 805. Portal 808*b* forwards the message toward listener 804, which results in the message being received by portal 808*a*. Portal 808*a* updates the iPCR of listener 804 in order to stop listener 804 from listening. Portal 808*a* updates the IRM isochronous resources associated with bus 807. Portal 808*a* then sends a completion message to controller 806.

Figure 8:
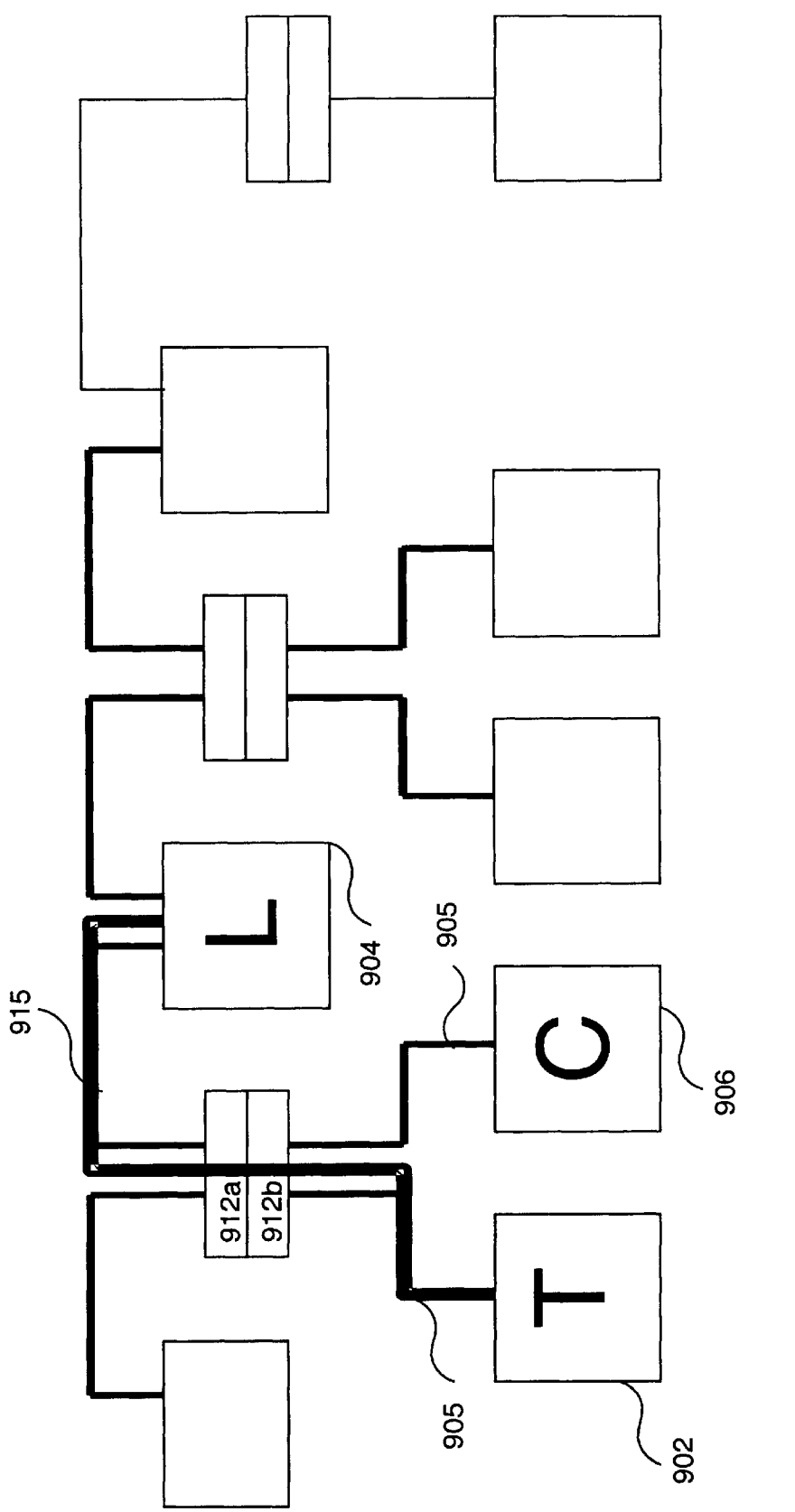
FIG. 8 is a block diagram of another embodiment for bus bridge isochronous transfer.

FIG. 8 is a block diagram of another embodiment for a bus bridge isochronous transfer. Referring to FIG. 8, a common connection isochronous transfer is illustrated. Talker 902 is connected by controller 906 to listener 904. In one embodiment, controller 906 may be on the talker bus 905, listener bus 915, or other bus. Each listener 904 is associated with a controller 906. The controller 906 may be the same or different for the various listeners 904.

In the example of FIG. 8, the connection message from controller 906 is processed by portal 912*a* in which it is found to have the same stream ID. This allows the new listener to listen to the perversely established channel.

Figure 9:
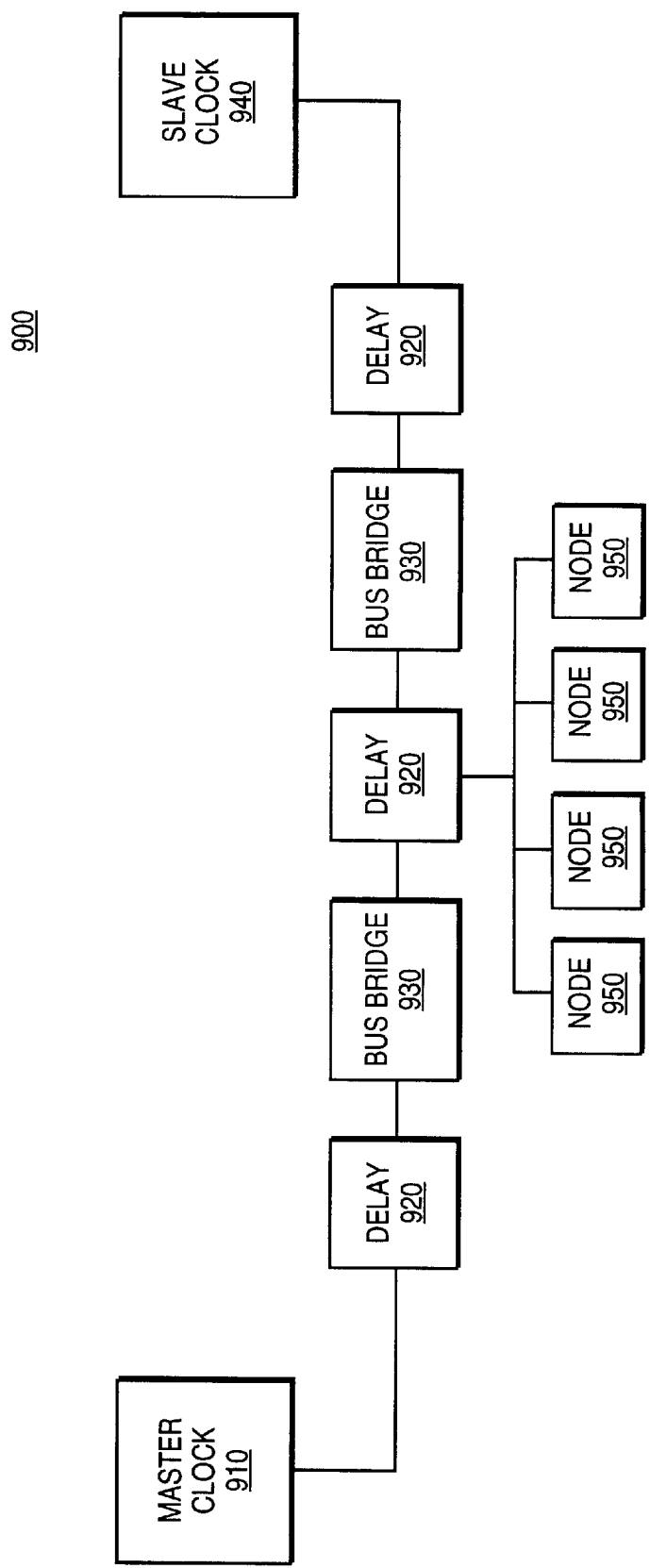
FIG. 9 is an embodiment of a network using the synchronization method an apparatus.

FIG. 9 shows network 900 having master clock 910, delays 920, bus bridges 930, and slave clock 940. The delays 920 include one or more nodes 950, which may be devices such as televisions or video recorders, for example. The master clock 910 sends a synchronization time stamp packet on network 900 at periodic intervals, such as every isochronous cycle, which may be 125 microseconds, for example.

However, because of delays 920, the synchronization time stamp packet may arrive at a given bus bridge 930 late. The delays are variable, and may be relatively long during one period, then relatively short during another period. This variation, or jitter error, in the delays, prevents the delays from being easily measurable. Therefore, each bus bridge 930 and slave clock 940 contains a synchronization apparatus that allows the bus bridge 930 and slave clock 940 to compensate for the jitter error and to synchronize its internal clock to the master clock 910.

Figure 10:
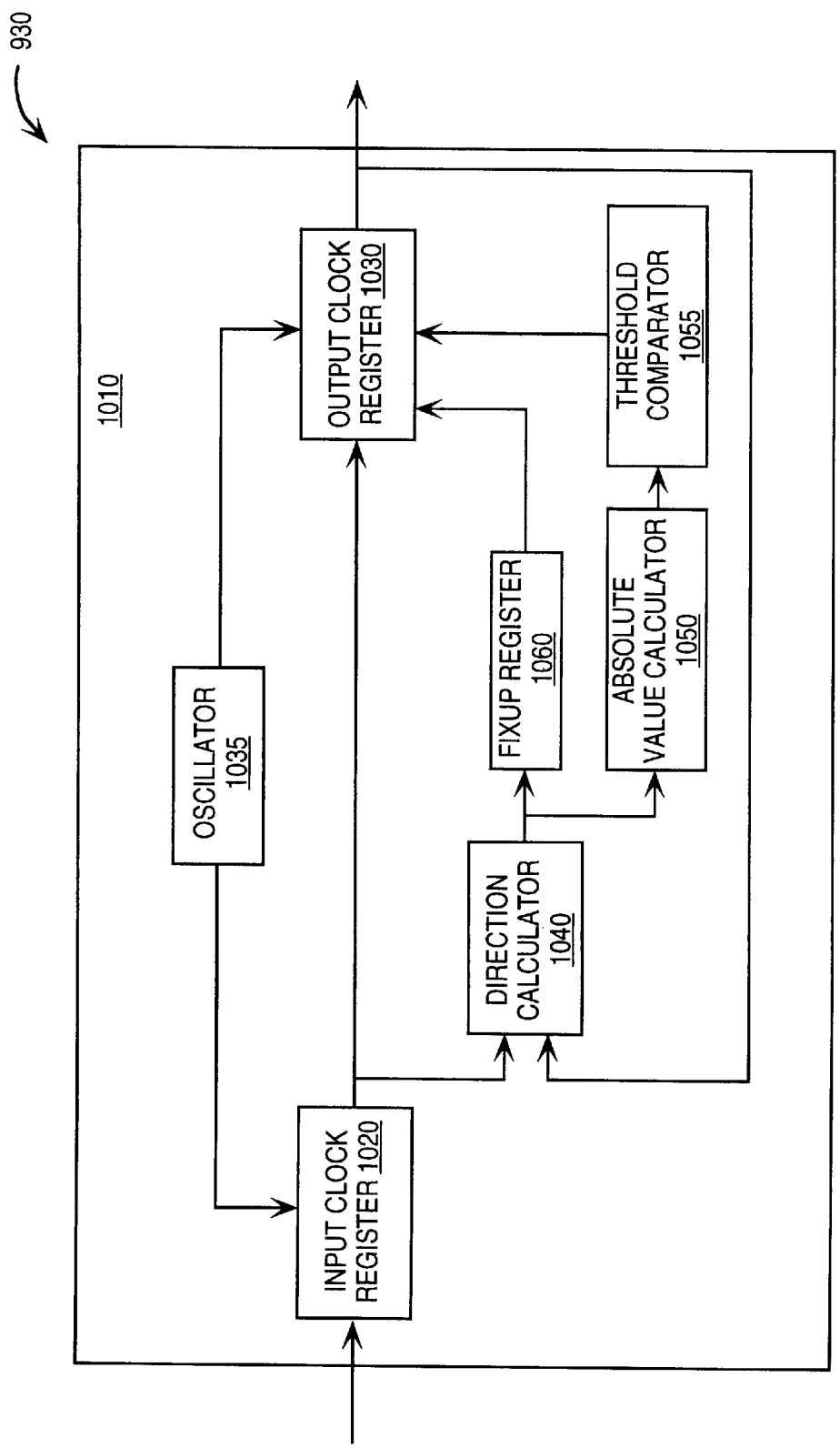
FIG. 10 is an embodiment of the synchronization apparatus.

FIG. 10 shows an embodiment of the synchronization apparatus 1010 of bus bridge 930 for synchronizing the bus bridge 930 to the master clock 910. The synchronization apparatus includes an input clock register 1020, which receives the synchronization time stamp packet initially sent by the master clock every isochronous cycle, and loads the time stamp value into register 1020. The apparatus also includes an output clock register 1030, which has a value that is increased at a rate controlled by oscillator 1035. In one embodiment, the oscillator 1035 increments the output clock register value once every tick. In one embodiment, a tick is 40 nanoseconds.

The output clock register outputs a second time stamp packet onto the network 900 every isochronous cycle. The values of the input and output clock registers may be compared once every isochronous cycle. In one embodiment, the isochronous cycle is 125 microseconds. If there is a difference between the two values, the output clock register may be adjusted by one tick during each isochronous cycle.

When there is a difference between the value of the input clock register 1020, and output clock register 1030, the apparatus determines whether the amount of the error is within a predetermined threshold. If so, the apparatus determines the direction of the error, then adjusts the tick increment, or value, of the output clock register based on the direction of the error.

For example, a direction calculator 1040 compares the value of the input clock register 1020 to the value of the output clock register 1030. In one embodiment, the direction calculator 1040 subtracts the value of register 1030 from the value of register 1020, to produce an error value of the output clock register. Then, an absolute value calculator 1050 determines the absolute value of the error value. The absolute value of the error is output by the absolute value calculator 1050 and received by threshold comparator 1055, which compares the absolute value of the error to a predetermined threshold stored in comparator 1055.

If the absolute value of the error is less than the predetermined threshold, then the direction of the error is received from the direction calculator 1040 by fixup register 1060. Fixup register 1060 outputs a fixup value to the output clock register when the error is below the predetermined threshold. The fixup value is received by the output clock register 1030, and causes the output clock register to adjust the value stored in register 1030 to compensate for the error.

For example, when the direction of the error is slow, the fixup value causes the value of the output clock register to increase by an additional tick during a subsequent tick from oscillator 1035. When the direction of the error is fast, the fixup value causes the value of the output clock register to remain constant during a subsequent pulse from oscillator 1035 thus slowing down the output time stamp value by one tick. In one embodiment, each tick of oscillator 1035 is 40 nanoseconds. The register may be affected by the fixup value once every isochronous cycle. The fixup constrains consecutive tick values to never be of opposite size (i.e., −1 and +1). Thus, the maximum cycle to cycle clock jitter is reduced.

Figure 11:
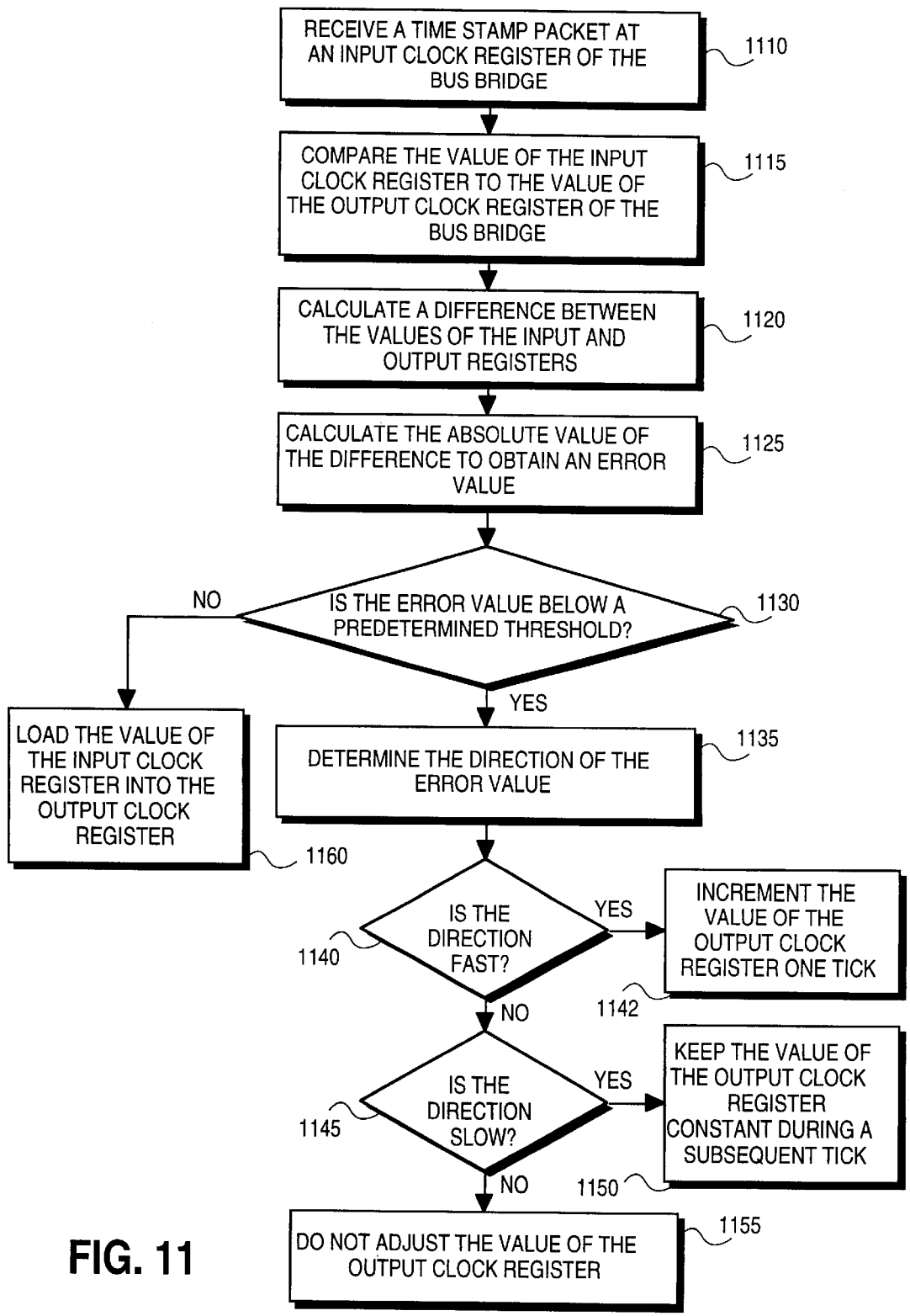
FIG. 11 is an embodiment of the synchronization method.

When the error value is not below the predetermined threshold, the value of the input clock register 1020 is loaded into the output clock register 1030. In one embodiment, the predetermined threshold is one half of an isochronous cycle. One-half cycle is selected as the threshold value because it allows for some margin of error without widely offsetting the performance or cost of the system. FIG. 11 is an embodiment of a method for synchronizing a bus bridge 930 to a master clock 910. A synchronization time stamp packet is received by an input clock register of the bus bridge, 1110. The value of the input clock register is compared to the value of the output clock register of the bus bridge, 1115. In one embodiment, the comparison is performed by calculating a difference between the values of the input and output clock register, 1120. The absolute value of the difference is calculated to obtain an error value, 1125.

The method then determines whether the error value is below a predetermined threshold, 1130. In one embodiment, the predetermined threshold is one half of an isochronous cycle. If the error is below the threshold, the direction of the error is determined, 1135. If the direction of the error is fast, such that the value of the input clock register is faster, or greater, than the output clock register, 1140, then the value of the output clock register is incremented by an additional count during a subsequent tick from the local reference oscillator clock of the bus bridge. If the direction of the error is slow, such that the value of the input clock register is slower, or less than, the value of the output clock register, 1145, then the value of the output clock register is not increased during a subsequent tick from the oscillator, 1150.

In one embodiment, the output clock register is adjusted in one tick increments, where one is 40 nanoseconds. However, the amount of the adjustment is related to the degree of accuracy of the master clock. For example, if the master clock is accurate to 100 parts per million (ppm), then the amount of adjustment may be 40 nanoseconds. But, if the master clock is accurate to 10 ppm, then the amount of precision used in adjusting the output clock register may be 4 nanoseconds (i.e., the one tick adjustment is 4 nanoseconds). Thus, the clock adjustments can be smaller and more precise when the precision of the master clock is more precise.

The degree of precision of the master clock can be included in the net refresh messages that are used to initialize the system. The bus bridges, or clock-slave nodes attached to them, after receiving the net refresh messages, can automatically adjust the precision of the tick adjustment based on the precision of the master clock. Thus, the synchronization method and apparatus determines the precision of the slave clock, based on the knowledge of the master clock accuracy. In one embodiment, the determination of the master-clock accuracy is made by including that value in the net refresh messages that are used to normalize busID addresses on the net. Then, the method and apparatus automatically adjusts the length of time of the ticks, so that the one-tick adjustment to the output clock register is related to the accuracy of the master clock.

In an alternative embodiment, input clock register 1020 receives a time stamp from a cable network and output clock register 1030 outputs a time stamp onto a wireless, or radio frequency (RF), transmission medium. In this embodiment, the input clock register receives a time stamp every 125 microseconds, but the output clock register outputs a time stamp every 2 milliseconds, because the RF cycle may be longer than the cable-based isochronous cycle. For example, the output clock register may output a time stamp onto the RF network once every 16 isochronous cycles. Thus, the cable network time stamp may be received up to 16 times before a time stamp is output to the wireless medium.

In this embodiment, direction calculator 1040 does more than determine the direction of the error. Direction calculator 1040 can measure the amount of the error to ±16 ticks. Thus, fixup register 1060 can adjust the value of the output clock register by up to 16 ticks during one RF cycle, which is 2 milliseconds, or 16 isochronous cycles. In this embodiment, when the bus bridge receives an input from a cable transmission medium, and sends outputs to a wireless network medium, the adjustment to the output clock register is performed once every wireless cycle. The range of the adjustment is the ratio of the cable cycle to the RF cycle.

While the invention is described in terms of embodiments in a specific system environment, those of ordinary skill in the art will recognize that the invention can be practiced, with modification, in other and different hardware and software environments within the spirit and scope of the appended claims.

What is claimed is:

1. A method for synchronizing a bus bridge to a master clock comprising:

receiving a time stamp packet at an input clock register of the bus bridge;

comparing the value of the input clock register to the value of an output clock register of the bus bridge;

obtaining an error value of the output clock register from the comparison; and determining whether the error value is below a predetermined threshold.

2. The method of claim 1, wherein comparing further comprises calculating a difference between the value of the input clock register to the value of the output clock register.

3. The method of claim 2, wherein obtaining the error value further comprises:

calculating the absolute value of the difference.

4. The method of claim 1, wherein the predetermined threshold is one half of an isochronous cycle.

5. The method of claim 1, further comprising repeating comparing, obtaining, and determining every isochronous cycle.

6. The method of claim 1, wherein the error value is below the predetermined threshold, further comprising determining the direction of the error value.

7. The method of claim 6, wherein the direction of the error value is either fast or slow.

8. The method of claim 7, wherein the direction of the error value is fast, further comprising incrementing the value of the output clock register by an additional count during a subsequent tick.

9. The method of claim 7, wherein the direction of the error value is slow, further comprising not incrementing the value of the output clock register during a subsequent tick.

10. The method of claim 1, wherein the error value is not below the predetermined threshold, further comprising loading the value of the input clock register into the output clock register.

11. An apparatus for synchronizing a bus bridge to a master clock comprising:

an input clock register to receive a first time stamp packet;

an output clock register to output a second time stamp packet;

a direction calculator to compare the first time stamp packet to the second time stamp packet and to output a direction of an error of the second time stamp packet;

an absolute value calculator to receive the direction of the error and to output an absolute value of the error; and a threshold comparator to determine whether the error is below a predetermined threshold.

12. The apparatus of claim 11 further comprising fixup register to receive the direction of the error and to output a fixup value to the output clock register when the error is below the predetermined threshold.

13. The apparatus of claim 12, wherein the direction of the error is slow and the fixup value causes the value of the output clock register to increase by an additional tick during a subsequent tick of a reference oscillator.

14. The apparatus of claim 12, wherein the direction of the error is fast and the fixup value causes the value of the output clock register to remain constant during a subsequent tick of a reference oscillator.

15. The apparatus of claim 11 wherein the value of the input clock register is loaded into the output clock register when the error value is not below the predetermined threshold.

16. The apparatus of claim 11, wherein the predetermined threshold is one half of an isochronous cycle.

17. An apparatus for synchronizing a bus bridge to a master clock comprising:

means for receiving a time stamp packet at an input clock register of the bus bridge;

means for comparing the value of the input clock register to the value of an output clock register of the bus bridge;

means for obtaining an error value of the output clock register from the comparison; and means for determining whether the error value is below a predetermined threshold.

18. The apparatus of claim 17, wherein said means for comparing further comprises means for calculating a difference between the value of the input clock register to the value of the output clock register.

19. The apparatus of claim 18, wherein said means for obtaining the error value further comprises:

means for calculating the absolute value of the difference.

20. The apparatus of claim 17, wherein the predetermined threshold is one half of an isochronous cycle.

* * * * *